United States Patent
Schubert et al.

(10) Patent No.: US 12,554,772 B2
(45) Date of Patent: Feb. 17, 2026

(54) COMPUTER-IMPLEMENTED METHOD OF PROVIDING AT LEAST ONE MACHINE LEARNING MODEL, IN PARTICULAR FOR INTELLIGENT AUGMENTED REALITY APPLICATIONS

(71) Applicant: Ramblr GmbH, Pullach im Isartal (DE)

(72) Inventors: Philipp Schubert, Puchheim (DE); Jennifer Krebs, Gilching (DE); Frank Angermann, Dresden (DE); Thomas Alt, Pullach im Isartal (DE); Anna Lanz, Munich (DE)

(73) Assignee: Ramblr GmbH, Pullach im Isartal (DE)

( * ) Notice: Subject to any disclaimer, the term of this patent is extended or adjusted under 35 U.S.C. 154(b) by 56 days.

(21) Appl. No.: 18/529,760

(22) Filed: Dec. 5, 2023

(65) Prior Publication Data
US 2024/0185544 A1 Jun. 6, 2024

(30) Foreign Application Priority Data
Dec. 5, 2022 (EP) .................................. 22211395

(51) Int. Cl.
*G06F 16/78* (2019.01)
*G02B 27/00* (2006.01)
(Continued)

(52) U.S. Cl.
CPC ......... *G06F 16/78* (2019.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 10,691,943 B1 6/2020 Ferstl
12,008,792 B1 * 6/2024 Bai .......................... G06N 3/08
(Continued)

FOREIGN PATENT DOCUMENTS

WO WO-2022195306 A1 * 9/2022 ........... G06F 18/251

OTHER PUBLICATIONS

Doherty Aiden R et al: "Investigating keyframe selection methods in the novel domain of passively captured visual lifelogs", Proceedings of the 2008 international conference on Content-based image and video retrieval, Jul. 7, 2008, pp. 259-268.
(Continued)

*Primary Examiner* — Jwalant Amin
(74) *Attorney, Agent, or Firm* — Getz Balich LLC

(57) ABSTRACT

A method of providing a machine learning model (MLM) for use in a process which uses a ML algorithm includes receiving image sensor data and performing processing modules. A first module includes receiving the sensor data, determining a source, parsing source information, converting the sensor data into data items, associating them with meta data information, and ingesting them with associated meta data information. The second module includes accessing a data warehouse and identifying an image keyframe per data item, and associating information indicative of the image keyframe with the respective data item. The third module includes presenting the image keyframe and associated information of the respective data item via an HMI for annotation, receiving an annotation and augmenting the image keyframe. The fourth module includes generating and/or updating a MLM using an annotated dataset, and the fifth module includes uploading the MLM as a task-specific MLM to a storage device.

15 Claims, 4 Drawing Sheets

(51) Int. Cl.
*G02B 27/01* (2006.01)
*G06F 3/01* (2006.01)
*G06N 3/091* (2023.01)
*G06T 5/70* (2024.01)
*G06T 19/00* (2011.01)
*G06V 10/70* (2022.01)
*G06V 20/20* (2022.01)
*G06V 20/70* (2022.01)
*H04N 13/178* (2018.01)
*H04N 13/332* (2018.01)
*G06N 20/00* (2019.01)

(52) U.S. Cl.
CPC ............ *G06F 3/013* (2013.01); *G06N 3/091* (2023.01); *G06T 5/70* (2024.01); *G06T 19/006* (2013.01); *G06V 10/70* (2022.01); *G06V 20/20* (2022.01); *G06V 20/70* (2022.01); *H04N 13/178* (2018.05); *H04N 13/332* (2018.05); *G06F 2203/0381* (2013.01); *G06N 20/00* (2019.01)

(56) References Cited

U.S. PATENT DOCUMENTS

| | | | |
|---|---|---|---|
| 2021/0209734 A1* | 7/2021 | Simhadri | G06V 40/165 |
| 2021/0312227 A1* | 10/2021 | Moradiannejad | G06F 18/214 |
| 2021/0390702 A1 | 12/2021 | Juillard | |
| 2022/0107652 A1 | 4/2022 | Uvarov | |
| 2023/0245317 A1* | 8/2023 | Morard | G06N 3/08 |
| | | | 382/128 |
| 2024/0325088 A1* | 10/2024 | Paulson | A61N 5/1049 |

OTHER PUBLICATIONS

EP Office Action for EP Patent Application No. 22211395.3 dated Jan. 2, 2026.

* cited by examiner

COMPUTER-IMPLEMENTED METHOD OF PROVIDING AT LEAST ONE MACHINE LEARNING MODEL, IN PARTICULAR FOR INTELLIGENT AUGMENTED REALITY APPLICATIONS

This application claims priority to EP Patent Appln. No. 22211395.3 filed Dec. 5, 2022, which is hereby incorporated herein by reference in its entirety.

BACKGROUND OF THE INVENTION

1. Technical Field

The present disclosure relates to a computer-implemented method of providing at least one machine learning model, in particular in the form of a data pipeline for intelligent Augmented Reality applications, and a corresponding computer program.

2. Background Information

Intelligent wearables of the future, such as smart glasses and headsets, are planned to make Augmented Reality (AR) and Virtual Reality (VR) ubiquitous in daily life. Such devices contain advanced imaging and sensing technologies enabling users to interact with virtual and real worlds in real-time as computer-generated content, images, videos, holograms, audio, etc. are laid over users' real-world scenes from their point of view to enhance their natural surroundings. To create an immersive AR experience for the user, face- or head-mounted sensors, like video camera, scan and capture natural scenes from the user's real environment, e.g., image and sound, as well as the user's movement and attention. The device subsequently scans and analyzes the captured scene to determine where to superimpose or play the pre-programmed virtual elements relative to the real environment. Next, it calls up the virtual elements, superimposing or playing them on/with the real-world scene in real-time.

There is tremendous potential in next-generation smart glasses. For example, by leveraging AI technology, these devices promise to recognize everything in their field of vision and connect those objects and/or movements to knowledge gathered earlier or retrieved online via the Internet. Situationally relevant information can then be displayed in the right location in a user's field of view (or played out loud) to warn the user of potential hazards or to reduce the risk of potential misunderstandings. See, for example, HEIN, D. & RAUSCHNABEL, P., Augmented Reality Smart Glasses and Knowledge Management: A Conceptual Framework for Enterprise Social Networks. January 2016. 10.1007/978-3-658-12652-0_5 at Page 85.

However, intelligent AR technology has not yet reached sufficient operational maturity and progress is currently inhibited. For example, advanced "egocentric" or first-person perception, i.e., from the viewpoint of the user, is the preferred basis of intelligent AR, but this requires algorithms to automatically solve a plethora of detection, segmentation, and classification tasks. With the state of technology constantly evolving, these tasks cannot be fully specified in advance. Increasingly sophisticated hardware is enabling the deployment of more complex machine learning models and architectural improvements can enhance the prediction performance, but both require extensive adaptations in model creation. As there is currently no one approach for model creation and because training data is situational and task-specific, deployment of models is reactive and sluggish.

Moreover, AI engines (i.e., parts of computer programs or algorithms for complex processing calculations) typically require an accurate and reliable stream of training data to produce machine learning models. Specifically, the full potential of smart glasses can only be realized by training AI to interact with the world from an egocentric perspective. This requires egocentric training data comprised of single, or preferably multiple sensor modalities, e.g., image sensing involving one or a multitude of different sensors (such as RGB camera, IR, LIDAR, geolocation (GPS), eye-gaze, and inertial measurement unit (IMU)). Advancements in intelligent AR development is hindered by the inefficiencies of (multi-)sensor egocentric data standardization and processing. In connection with the ingestion of training data, obstacles include issues with sensor variations, file type dissimilarity, privacy law compliance, quality, analysis, versioning, and storage of data. These problems have a significant downstream impact on machine learning endeavors because effective models require quality data.

For example, WO 2019/245618 A and US 2022/107652 A1 disclose a data pipeline and deep learning system for autonomous driving, in which an image captured using a sensor on a vehicle is received and decomposed into a plurality of component images. Each component image of the plurality of component images is provided as a different input to a different layer of a plurality of layers of an artificial neural network to determine a result. The result of the artificial neural network is used to at least in part autonomously operate the vehicle.

U.S. Pat. No. 10,691,943 B1 discloses annotating images based on multi-modal sensor data. Imaging data or other data captured using a camera may be classified based on data captured using another sensor such as a thermal camera, a radiographic camera or an ultraviolet camera, and such sensors capture data simultaneously from a scene, the respectively captured data may be processed to detect one or more objects therein. A probability that data depicts one or more objects of interest may be enhanced based on data captured from calibrated sensors operating in different modalities. Where an object of interest is detected to a sufficient degree of confidence, annotated data from which the object was detected may be used to train one or more classifiers to recognize the object, or similar objects, or for any other purpose.

US 2021/390702 A1 discloses systems and methods for triggering machine learning (ML) annotation model retraining. The method includes an annotation model accepting raw data images with undefined variations of a first shape with a coarse boundary surrounding a first shape. The annotation model creates an annotated image with annotation marks forming a refined boundary surrounding the first shape. An agent user interface (UI) modifies the refined boundaries to supply corrected images. A mediation software application compares the annotated images to corresponding corrected images and supplies an annotation model retraining resource analysis for the first shape in response to comparing the annotated images to the corrected images.

These techniques, however, are not appropriate for sufficiently solving problems of processing (multi-)sensor data for intelligent Augmented Reality, for which egocentric data is preferable, as mentioned above.

There, thus, exists a need for a customized computer-implemented method that can maximize salient object information from the captured sensor data and provide a higher level of steady contextual information to a deep learning network for deep learning analysis.

SUMMARY OF THE INVENTION

The present disclosure relates to a computer-implemented method and computer program according to the appended claims. Embodiments are disclosed in the dependent claims.

According to an aspect, there is disclosed a computer-implemented method of providing at least one machine learning model for use in a process which uses at least one machine learning algorithm, comprising: receiving, by at least one computing device, sensor data from at least one sensor including receiving at least one image captured by an image sensor; performing, by the at least one computing device, a sequence of processing modules in series, or in an iterative process with one or more feedback loops, from a first to a fifth module of the processing modules, wherein: the first module comprises receiving the sensor data, determining a respective incoming source of the sensor data, parsing source information including meta data information, converting the sensor data into a plurality of standardized data items, associating at least some of the standardized data items with meta data information, and ingesting at least some of the standardized data items with associated meta data information in a data warehouse which is adapted for remote access, the second module comprises accessing the data warehouse and identifying at least one image keyframe per standardized data item of the data warehouse, and associating additional information indicative of the at least one image keyframe with the respective standardized data item; the third module comprises presenting the at least one image keyframe and associated additional information of the respective data item via a human machine interface to a human annotator for annotation accompanied by one or more initial annotations automatically generated by one or more foundation models, receiving an annotation from the annotator via the human machine interface and augmenting the at least one image keyframe with corresponding annotation information to at least one annotated dataset; the fourth module comprises at least one of generating and updating at least one machine learning model using the at least one annotated dataset to also provide updated initial annotations for non-proofread frames; the fifth module comprises uploading the at least one machine learning model as a task-specific machine learning model to a storage device for access by one or more processes which use at least one machine learning algorithm.

Accordingly, aspects of the invention may act as a software assembly line or model factory for analysis techniques, enabling the rapid development and adaptation of various model architectures and targeted specific annotation tasks. The data pipeline can expedite, semi-automate, and scale the processing required to ingest, standardize, de-identify, transform, version, enrich, and send sensor egocentric data to downstream AI training, tuning, and inference. With the increase of volume, variety, and velocity requirements for egocentric data, it will become increasingly vital for intelligent AR developers to find a data pipeline solution that can scale, both geographically and performance wise, inside of cloud, hybrid cloud and edge computing environments. See, for example, SCHMARZO, BILL: Evolution of Intelligent Data Pipelines. MIT Technology Review Online. Dec. 6, 2021, Accessed on 25 Nov. 2022 from https://www.technologyreview.com/2021/12/06/1040716/evolution-of-intelligent-data-pipelines/.

In an aspect, an enhanced functionality of the invention is achieved by the combination and interplay of the processing modules. In particular, the invention is a collection of processing modules, whereby each one performs a specific operation or sequence of operations on data that goes through it. The modules are organized in series, e.g., a first module receives the raw data stream, processes it, and then makes its output available to the following module in the sequence. See, for example, US 2005/0154696 A1, in particular Col. 1 at [003]. However, the process may also be iterative with one or several feedback loops. Together, the processing modules cut down on data processing times and errors for machine learning model generation.

The invention may be applicable to other fields of use beyond Augmented Reality, such as, autonomous driving. According to embodiments, in addition to the challenges described above, it may address the following challenges in connection with processing egocentric data for machine learning training:

Collected data is highly diverse and crosses multiple domains.

Sensor rig cameras have varying capabilities, e.g., for dealing with lighting variances, resulting in variable image resolution and quality.

Video data streams show rapid and frequent location and attention changes (e.g., head movements can result in motion blur).

Egocentric data capture does not follow a set, pre-defined ruleset (dynamic, head-mounted sensor rig with vast object categories) in contrast to, e.g., data capture for autonomous driving (static, car-mounted camera with limited object categories).

Data privacy regulations hamper data use and retention.

According to an embodiment, the at least one machine learning model is configured to be used by one or more processes of an augmented reality application, and the sensor data include egocentric sensor data collected from the perspective of a user of a wearable computing device.

According to an embodiment, the sensor data are multi-sensor data provided by one or more sensors.

For example, data may be collected by a wearable hardware device (such as "Tobii Pro Smart Glasses") without an AR application. However, according to another embodiment, an AR application running off a wearable hardware device may simultaneously provide an AR experience whilst collecting egocentric sensor data to insert into the data pipeline.

According to an embodiment, the sensor data include one or more of the following data: one or more images; one or more video streams; geographic positional data; audio data; infrared data; collector eye-gaze data (in particular, corneal reflection, stereo geometry, eye orientation and/or movement); and inertial measurement data (in particular, accelerometer, gyroscope and/or magnetometer data).

According to an embodiment, the at least one machine learning model is configured to be used by one or more processes of an augmented reality application and the data is captured by one or more respective sensors worn by a user of an augmented reality application.

According to an embodiment, associating at least some of the standardized data items with meta data information comprises assigning a respective meta data container to at least some of the standardized data items containing one or more of the following: a media property, in particular a video or image property, location information, schema and version information, and one or more additional data channels for different sensor input modalities or connected information. According to embodiments, connected information may be any information that might not be necessarily sensor information from a device or annotation information, such as data check logs, legal meta data, or any accompanying data not necessarily from the device.

According to an embodiment, the first module comprises obfuscation of specific data categories, in particular blurring of data-subject faces, license plates and/or voice-audio filtering, in accordance with at least one regulatory scheme.

According to an embodiment, associating at least some of the standardized data items with meta data information comprises assigning additional meta data information to the standardized data items comprising meta data regarding situation, event, objects of interest and/or location tags.

According to an embodiment, the first module comprises manual verification of data collected against task requirements, including at least one of functional and legal tasks, and automatic tasks verification via object categories in view. For example, task requirements/verification could be more than just functional check (e.g., where automatic check for face instances is performed and compared to number of legal consents).

According to an embodiment, the third module comprises one or more processes for manually refining one or more of the annotations including instance segmentation according to which object instances as returned by a machine learning model are used as a starting point for manual revision and corrections.

According to an embodiment, the third module comprises one or more processes for manually refining one or more of the annotations including categorization according to which one or more object instances is assigned one or more putative categories that originate from the machine learning model output and are used to display annotation suggestions to the human annotator.

According to an embodiment, annotation is further extended by providing guiding signals, such as annotation suggestions, annotation correction suggestions, salient object highlighting, and/or putative error markings.

According to an embodiment, the third module comprises a validation step during human annotation to ensure quality is high, which can be executed manually (4-eye principle) or automatically. For example, while validation is often considered part of a QA Review (see below), it may also be instructive during human annotation to help improve quality.

According to an embodiment, the third module comprises at least one manual refinement process with guidance to highlight image frames or frame regions with high likelihood of annotation errors.

According to an embodiment, identifying at least one image keyframe per standardized data item comprises excluding image frames that contain little to no contrast or unsharp objects and promoting image frames with rich context.

According to an embodiment, identifying at least one image keyframe per standardized data item comprises parsing additional sensor information from one or more of gaze tracking, location sensing, inertial measurement data, and context information.

According to an embodiment, associating at least some of the standardized data items with meta data information comprises assigning standardized time stamps to the respective sensor data, in particular creation datetime and/or modification datetimes. For example, time stamps are preferable in the context of synchronizing sensor data (e.g., video frame with eye gaze).

According to a further aspect, there is provided a computer program comprising instructions which, when the program is executed by at least one computer, cause the at least one computer to carry out a method according to the invention, as described herein.

BRIEF DESCRIPTION OF THE DRAWINGS

Aspects of the invention will now be further described in connection with the following Figures, which illustrate exemplary embodiments, in which.

DETAILED DESCRIPTION OF THE INVENTION

Figure 1:
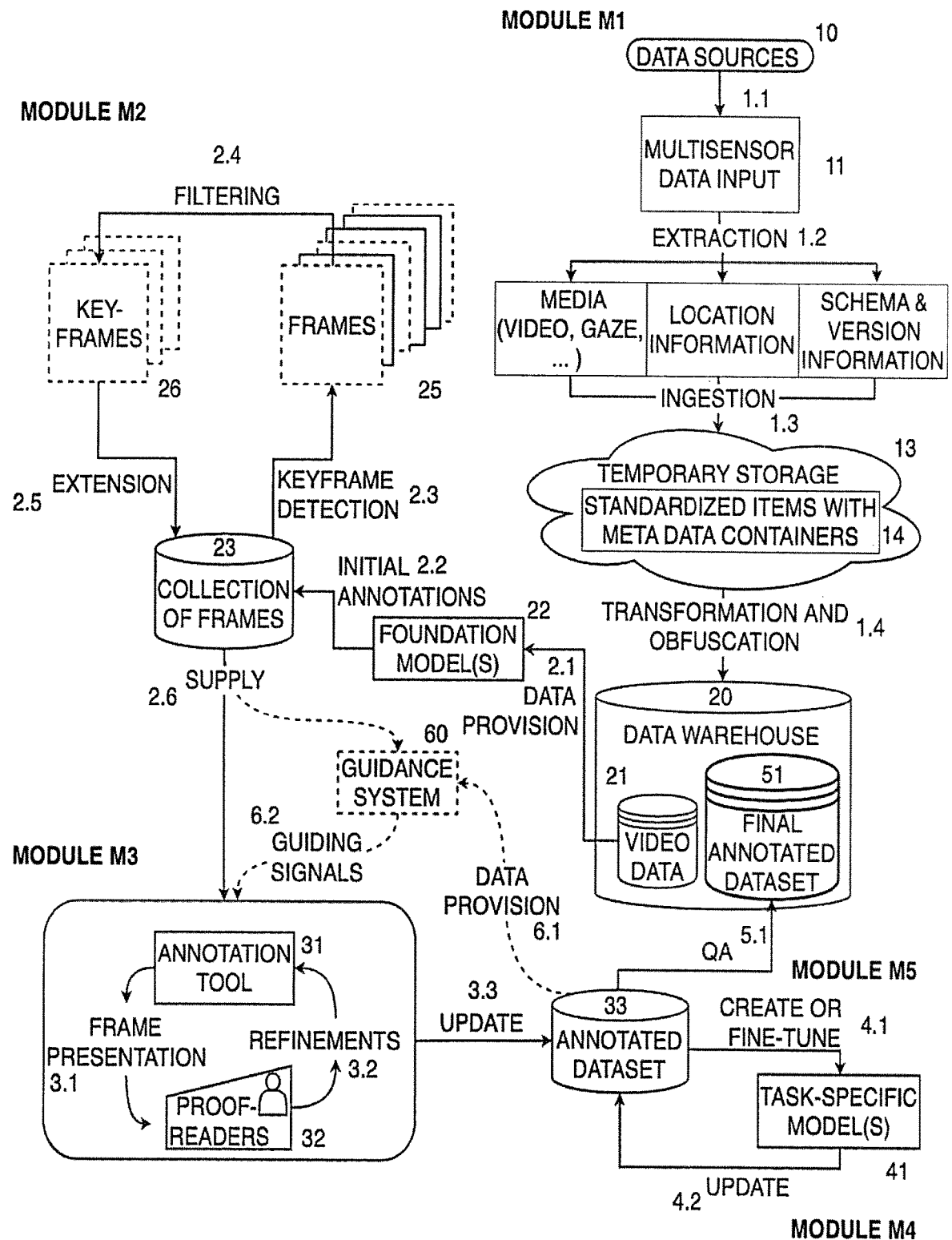
FIG. 1 shows a computer-implemented method according to embodiments of the present disclosure.
Figure 2A:
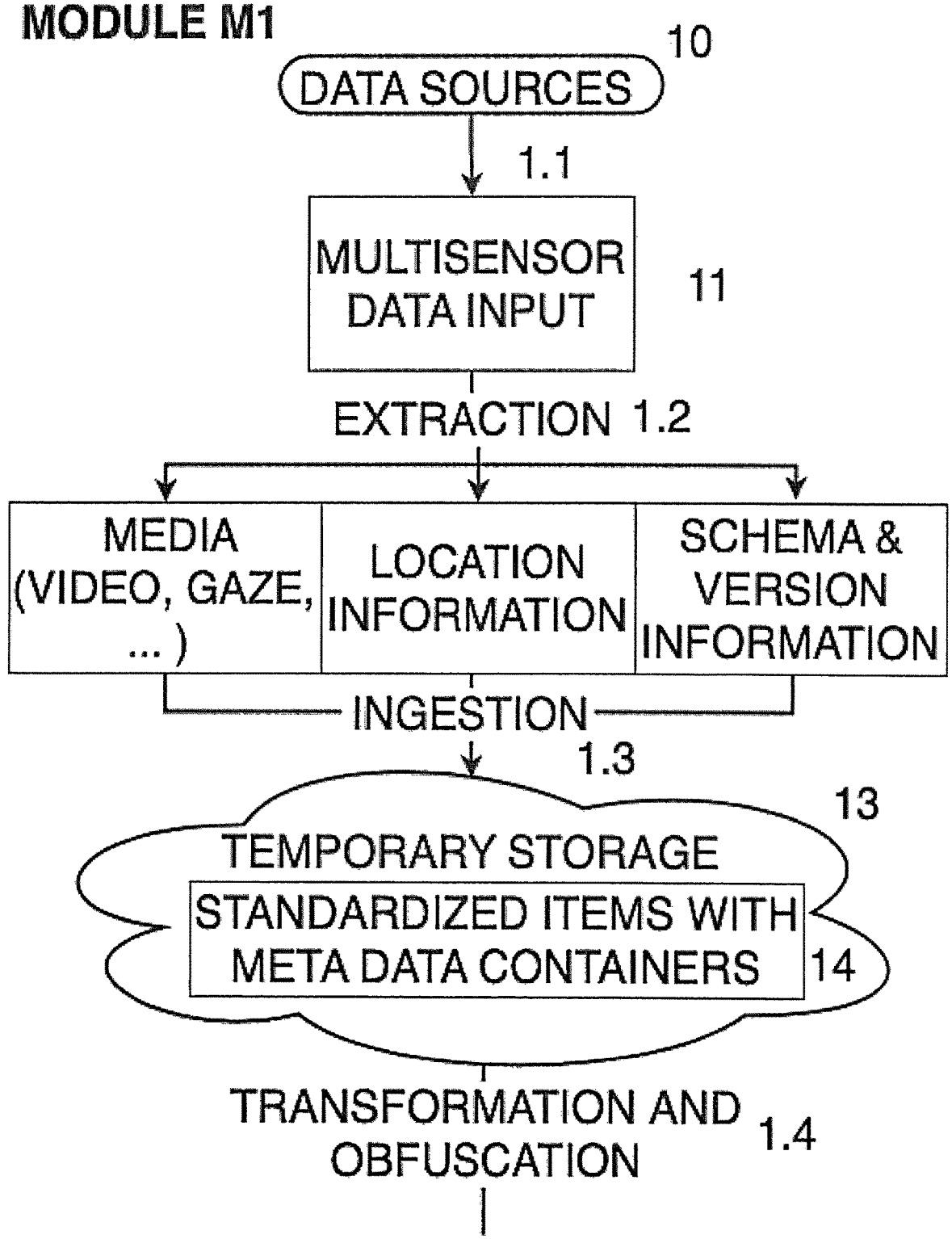
FIG. 2A, 2B show respective enlarged views of the method according to FIG. 1.
Figure 2B:
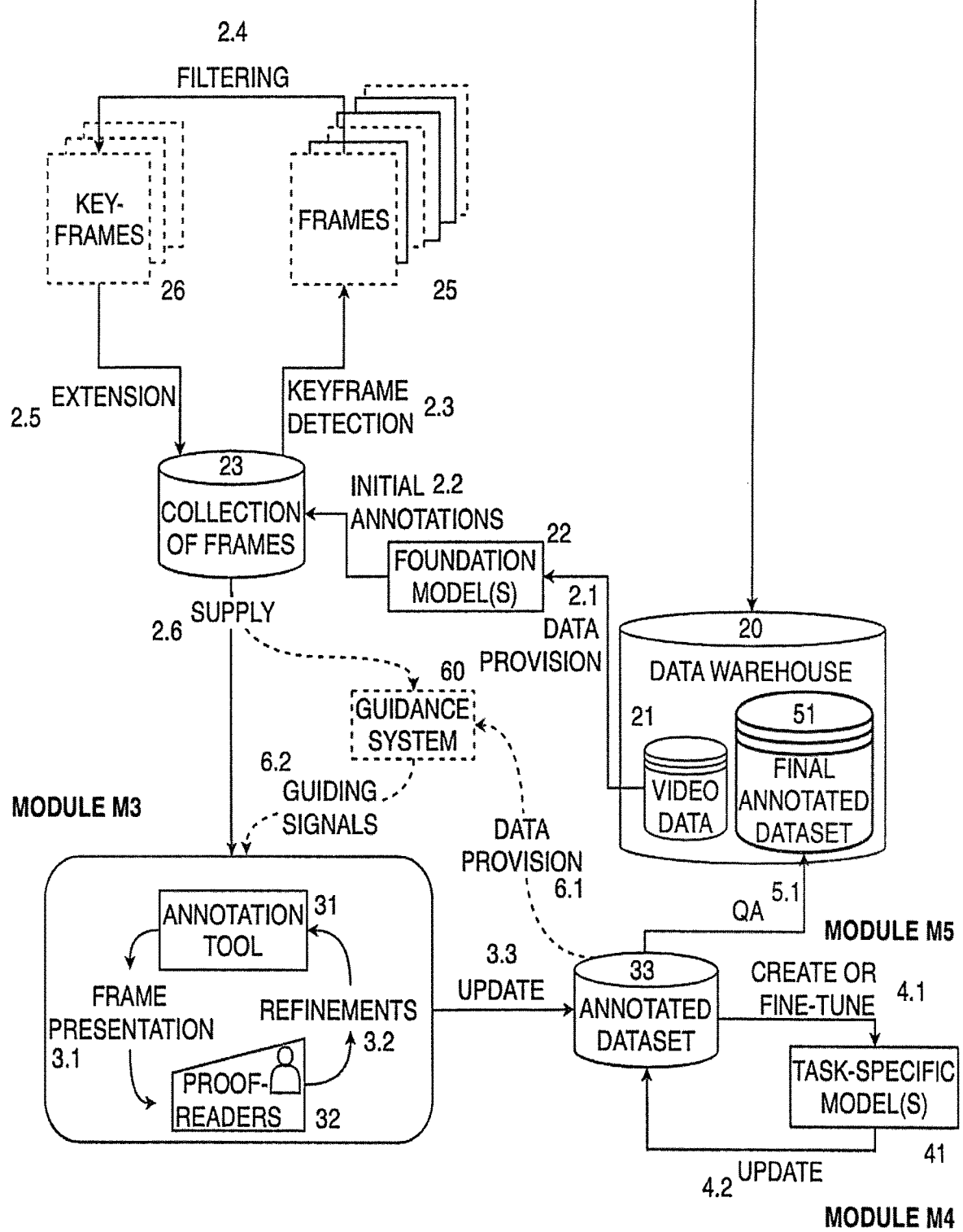

Aspects of the invention will now be described in more detail in reference to the Figures. It should be noted that the invention is not limited to the disclosed embodiments, which are provided mainly for describing certain aspects of the invention in an exemplary manner. A detailed description of one or more embodiments of the invention is provided below along with accompanying Figures that illustrate the invention. The invention is described in connection with such embodiments, but the invention is not limited to any embodiment. For the purpose of clarity, technical material or terms that are known to the skilled person in the art will not be described in detail so that the invention is not unnecessarily obscured.

Machine Learning (ML) as used herein is understood as a term which is commonly known in the art. The technique involved with ML is sometimes also designated as Deep Learning (DL), Artificial Intelligence (AI), etc. ML is used as a term which describes all the different forms of algorithms which are based on machine learning or deep learning. This could be Image Classification, Object Detection, or other ways of interpreting sensor, task and/or process data. For example, deep learning analysis is performed using a machine learning model such as an artificial neural network.

A machine learning model is understood as being a model ready to be used by an AI or ML algorithm and is, for example, an artificial neural network.

Context or context information is used herein as a collection of information which is indicative of the situation, use case, environment and/or intention associated with the ML process in order to create an appropriate machine learning model.

Data refers to one or more of images, objects, environments, actions, gestures or other general features (visual, numerical, acoustical, etc.) which can be detected by using one or more sensors of various types. A frame is a common term known in the art used for a single still image. A keyframe is a frame, for example having one or more properties such as contrast exceeding a particular threshold, which is suitable to be selected among a plurality of frames for the further procedure according to aspects of the invention as described herein. For example, in case of a video, keyframe(s) of a video for example typically aim to be the frame or smallest set of frames that provide an accurate or most accurate representation of the video.

Annotation or annotated data refers to data which has a configuration such that it can be used for generating ML-based processes or components of such processes. Particularly, annotations or annotated data comprises machine readable information about the data, e.g., used for training a machine learning model. Typically, it comprises a description (annotation) of the captured data in a format which can be further processed by a machine.

In a potential implementation, the computing device 1 and/or some of the data sources (like one or more sensors, generally referred to in FIG. 1 as data source) 10 may be implemented in software and/or hardware, in discrete or distributed manner, in any appropriate processing device, such as in one or more microprocessors of a local device, e.g., of a mobile or wearable computer system and/or of one or more server computers accessible through local network and/or the internet. Unless stated otherwise, a component such as a processor or a memory or storage device described as being configured to perform a task may be implemented as a general component that is temporarily configured to perform the task at a given time or a specific component that is manufactured to perform the task. As used herein, the terms processor, processing device or computing device respectively refer to one or more devices, circuits, microprocessors, servers and/or processing cores configured to process data, such as computer program instructions.

In applying aspects of the invention, potential AR application examples (non-exhaustive) are:

Application 1: Video, eye-gaze, and IMU data of fitness equipment and human bodies during exercise is processed towards recognizing a spectrum of human body exercise positions, human movements, and contextual information (e.g., background visual and audio "noise"). This can be leveraged by end-user app creators to track the correct execution of workout exercises provided by a fitness studio for their club members. The consumer device, e.g., smart glasses worn by user, is turned on prior to starting the exercise in front of a mirror.

Application 2: Video, IMU, eye-gaze, and audio data of food, people, kitchen implements, and meal preparation with spoken descriptions is processed towards detecting culinary utensils and appliances, food categories, cooking activities, and contextual information. End-user applications can leverage these models to guide hobby cooks on how to prepare meals. For this purpose, the set of videos shown to the end user on her smart glasses is also accompanied by spoken instructions played through the device.

Application 3: Video, IMU, eye-gaze and audio data of furniture, humans and assembly activities is processed towards detecting furniture and hardware categories, human movements, assembly tasks, and contextual information. An end-user application could guide users on how to assemble furniture. During use, the world-facing camera on the smart glasses is activated to detect the relevant step in the user manual, and virtual content is superimposed on the smart glasses to provide guidance on the next steps. Eye tracking is used to understand whether the user is focusing on the correct step.

Application 4: Video, IMU, eye-gaze, and audio data of humans and home appliance operation and servicing is processed towards detecting appliance parts, human movements, maintenance activities, and contextual information. End-user applications could guide users on how to perform service and maintenance tasks, such as descaling the automatic coffee machine, replacing light in the oven, or cleaning air fryer, via superimposed virtual information. The world-facing camera can be used to detect when to call a support engineer. Further video, IMU, eye-gaze, and audio data can be recorded in failure cases to improve automated instructions. Superimposed videos can enhance Q&A user manuals and instruction books.

Application 5: Video, GPS, IMU, and eye-gaze data of outside scenery and human interaction with external environments is processed towards detecting geolocation with human movement and contextual information and towards recognizing environmental hazards, such as, wild animals, uneven terrain, people, and traffic, from the perspective of a cyclist. For the possible end-user application, eye-gaze data is used to supply a safety feature during bicycling. Such safety feature could include superimposed image or audio warnings for real-time unnoticed detours, hazards, cars, and pedestrians.

The method according to aspects of the invention, which is implemented by at least one computing device or computer system or computer apparatus (schematically indicated at 1), involves receiving, by the at least one computing device 1, sensor data from one or more sensors 10, according to embodiments from more than one sensor (also called multisensor data), including receiving at least one image captured by an image sensor which is included in the at least one sensor 10 illustrated in FIG. 1, as also described in more detail below.

The one or more computing devices 1 perform a sequence of processing modules in series, or in an iterative process with one or more feedback loops, from a first to a fifth module of the processing modules, as shown according to embodiments in the Figures and described in more detail below.

In the following, embodiments of the first module will be described. In general, functions of the first module can be headed with "data ingestion and pre-processing":

In general, as set out above, the first module M1, as shown in FIG. 1, comprises receiving the sensor data, determining a respective incoming source of the sensor data, parsing source information including meta data information, converting the sensor data into a plurality of standardized data items, associating at least some of the standardized data items with meta data information, and ingesting at least some of the standardized data items with associated meta data information in a data warehouse which is adapted for remote access.

For example, according to embodiments, the first module M1 receives raw sensor data 11 from data sources 10 (step 1.1) which includes, for example, images and video streams, GPS sensing, audio, infrared, collector eye-gaze (e.g., corneal reflection, stereo geometry, eye orientation, and/or movement), and/or IMU (such as accelerometer, gyroscope, and/or magnetometer) data. As this data is collected from the perspective of the user, it is referred to as "egocentric data". Generally, the data may be captured by equipping a human data collector, for example, with a head-mounted sensor rig (e.g., smart glasses) known in the art.

The sensor data 11 (according to embodiments multisensor egocentric data) may come from numerous sources or input streams, such as directly from the respective sensors, or via inhouse collections, open-source public datasets, or third-party proprietary datasets. The data incoming from these different streams typically comprise numerous data files in varying formats that might not be correlated or standardized.

Initially, pre-processing (steps 1.1, 1.2 and 1.3) may involve the following standardization and transformation actions:

Data ingestion: Determine incoming source of sensor data, parse source information, and sort into temporary storage 13.

Extraction and transforming: To ensure data integrity, findability, accessibility, interoperability, and reusability, a meta data container is assigned with media properties (e.g., video or image), location information where available, schema and version information, and further additional data channels for different sensor input modalities or connected information.

Assigning standardized time stamps to all the different sensor streams, e.g., by transforming absolute datetimes to timestamps relative to source datetime. For example, source datetime (e.g., imported data from sensor rig), creation datetime, e.g., internal intake date, modification datetimes, which log internal processing actions.

Converting the sensor data into standardized, processable data units of similar size and format (e.g., MP4 video files with standardized pixel format and video encoding of similar length).

Further optional steps may be obfuscation of specific data categories (step 1.4), e.g., blurring of data-subject faces and license plates and/or voice-audio filtering, in accordance with the GDPR and/or other privacy regulatory schemes.

Assigning additional meta data information to the data items (e.g., situation, event, objects of interest and/or location tags).

Further optional steps may be manual verification of data collected against task requirements (e.g., legal and/or functional tasks) and automatic tasks verification via object categories in view.

In the present embodiment, a result of the transformation activities are standardized data items with meta data containers 14. These can be bundled into datasets or collection of datasets serving a specific purpose (e.g., covering egocentric, open-world scenarios).

After transformation, in step 1.4, the data is ingested into a data warehouse 20 that allows for findability and distributed access for visualization, annotation, and proofreading. Storage may use a combination of cloud native approaches based on multiple database architectures for specific requirements. All data and model storage components may support encryption-at-rest technologies and access control. Storage is globally distributable. In addition to encryption-at-rest and in transit, individual client-side encryption might be used.

As data is highly diverse, from unstructured to structured data, the storage allows flexibility in data structures. The proposed architecture supports versioned schema enforcement as well as governance and auditing necessities.

The data warehouse 20 also stores data generated or derived through the pipeline, including augmented and analyzed data items, thereby enabling referencing and further iterations as well as comparison and improvements of the pipeline outcome (see FIG. 1, Data Warehouse).

Sensor data 21, such as video or image, in addition to further sensor data under consideration of the extraction and transformation steps described above, can be added to the data warehouse 20 based on defined criteria (such as, user feedback on satisfaction with results or confidence of detections) and stored for further enablement of model training.

For example, in Application 4 above, in the case of needing to engage a support engineer, the user could agree to having sensor data recorded which is then transformed and stored in the data warehouse 20. These data items can be used to improve model creation of the particular use case (e.g., descaling coffee machine) in an individual situation (e.g., coffee machine under bad light conditions partially obfuscated).

In the following, embodiments of the second module will be described. In general, functions of the second module can be headed with "training and proofreading preparation":

In general, as set out above, the second module M2, as shown in FIG. 1, comprises accessing the data warehouse and identifying at least one image keyframe per standardized data item of the data warehouse, and associating additional information indicative of the at least one image keyframe with the respective standardized data item.

In particular, according to embodiments, in preparation for using schematized data for training and proofreading, the meta data will be extended with additional parameters. The additional parameters contain information about keyframes, which are identified by, e.g., excluding frames that contain little to no contrast or unsharp objects (e.g., through fast head movements) and promoting frames with rich context (see FIG. 3—described in more detail below). Further information can be considered such as additional sensor information from gaze tracking, location sensors, IMUs or context information. The extracted media properties may be used to propel proofreading by presenting only keyframes for manual refinement, or to weight samples presented during training by their content.

In the example Applications described above, the IMU data can be used to filter frames that are less informative for the annotation process. For example, it can be determined that significant head movement will lead to motion blur and thus those frames will be excluded. Furthermore, very little movement in above Application 1 could result in determining a pause and excluding those sections. Selecting such keyframes builds the basis for efficient annotation in that only keyframes are annotated, saving significant time and resources.

Gaze data (e.g., attention markers) can be used to determine saliency of objects in the scene, which enables increased focus and prioritization of regions during proofreading. This mechanism allows to filter objects that are not relevant in the current context, e.g., objects that are in the background or only partially visible due to occlusions.

An optional step towards a valid training dataset is the generation of recommendations for the proofreading steps due to initial inference tasks on the datasets. This can be used to further prioritize a selection of keyframes to be presented during proofreading.

The data items are provided (2.1) to one or more foundation models (22) in order to obtain initial annotations (2.2) for each image frame, stored as a collection of frames 23. The image frames are filtered by detecting keyframes (2.3-2.4) and the resulting keyframe information is used to extend the frame collection (2.5). Note that the initial annotations provided by the one or more foundation models may also be provided after keyframe filtering in case compute cost outweighs additional information for the filtering.

In the following, embodiments of the third module will be described. In general, functions of the third module can be headed with "annotation":

In general, as set out above, the third module M3, as shown in FIG. 1, comprises presenting the at least one image keyframe and associated additional information of the respective data item via a human machine interface, such as a display of a computer device, to a human annotator for annotation accompanied by one or more initial annotations automatically generated by one or more foundation models, receiving an annotation from the annotator via the human machine interface and augmenting the at least one image keyframe with corresponding annotation information to at least one annotated dataset.

Typically, curating data for annotation and annotation quality are top challenges for companies preparing data for training models. Failure to annotate data at high quality often leads to poor model performance.

In particular, according to embodiments, a starting point of annotation re the detected keyframes in the collection of frames 23 supplied in step 2.6, which may be accompanied by initial annotations, of which each is manually annotated through an annotation framework that presents the image data and required annotation tools depending on the target task. Such tasks may cover the pixel-level annotation of individual object masks, the categorization and attribute determination of existing object masks or the labeling of scene properties.

The keyframes presented by the annotation tool 31 to the annotators (or proofreaders) 32 in step 3.1 are accompanied by automatically generated initial annotations, which were generated by the foundation models 22. Typically, as known in the art, foundation models are trained on a large pool of diverse datasets and refer here to models outputting instances of objects that are categorized into a set of general, high-level categories (e.g., person, food, furniture, floor, sky, etc.).

The annotation process may further be extended by guiding signals (step 6.2) such as annotation correction suggestions, salient object highlighting, and/or putative error markings (see FIG. 1, guidance system 60). For example, category suggestions can be implemented as an online-learning system that is updated with recent manual annotations to propose object categories in near real-time. The data are provided to the guidance system 60 through step 6.1 from the annotated dataset 33. According to an embodiment, the guidance system 60 may be implemented as a bundle of optional improvement processes, like oversegmentation or other improvement processes. According to embodiments, the guidance system 60 may also include some processes like correction suggestions and refinement help regarding potential errors.

Example Application 1

Each workout exercise is covered by keyframes and annotations which target the different body parts of the athletes (legs, arms, head, torso, . . . ) and exercise equipment such as barbells, kettlebells, and machines. Manual annotations are supported by two foundation models, of which one outputs per-person masks (foundation model) and the other an oversegmentation (improvement process) providing suggestions of the different body parts within person-masks. The oversegmentation partitions the frame into coherent regions and is more biased by similar texture than the foundation model. For example, shirt, shorts, arms, and legs are independent regions in the oversegmentation, but they all belong to the same person-mask.

Each body-part region is then corrected by the human annotator and labeled with the corresponding category. Category suggestions are optimized through an online-learning approach that considers per-object statistics and matches unlabeled objects with previously categorized objects.

In the following, embodiments of the fourth module will be described. In general, functions of the fourth module can be headed with "model generation":

In general, as set out above, the fourth module M4, as shown in FIG. 1, comprises at least one of generating and updating at least one machine learning model using the at least one annotated dataset.

According to embodiments, the annotated data of the annotated dataset 33 (updated in step 3.3) can be used to create a task-specialized model from scratch or to update an existing model and finetune it for the target task (step 4.1). The task-specific model 41 may subsequently be applied to the rest of the data elements (step. 4.2). Updating an existing model with newly annotated data can be done incrementally and iteratively in small steps: After the annotation of a first, minimal set of videos (e.g., more than 100 frames), the image-annotation pairs are used to finetune the starting model to output a task-specific object instance segmentation (shape identification) and object categories (categorization), which in turn provide a more detailed starting point for the human proofreading than what would be available with the original foundation models. The fine-tuned model is subsequently applied to the rest of the elements with more detail than what would be available with the original foundation models.

According to embodiments, two processes for manually refining (proofreading) two major types of annotations are further elaborated below:

Instance segmentation: Object instances as returned by the model are used as starting point for manual revision and corrections. The correction process may comprise re-assigning chunks of pixels to specific objects via a brush tool or by merging or re-assigning whole superpixels (sub-object fragments that partition the image).

Categorization: Every object instance is assigned a putative category that originates from the model output and used to display an annotation suggestion to the human annotator. The annotation suggestion may be extended or refined (cf. step 3.2) based on the scene context and annotation history.

The proofread, annotated dataset can further be used to update the original foundation models to provide more accurate initial predictions on the next dataset. For this purpose, the task-specific and detailed categories are mapped back to a coarse level in order to provide general applicability. In the case of the example Applications above, the foundation model as starting point for Applications 1 and 4 would benefit from additional training data provided by Application 2 (object masks for kitchen utensils, food, person, . . . ).

The foundation models 22 as well as the task-specialized models 41 generate object masks and category predictions (step 4.2).

In the following, embodiments of the fifth module will be described. According to embodiments, functions of the fifth module can be headed with "inference/Quality Assurance (QA) review":

In general, as set out above, the fifth module M5, as shown in FIG. 1, comprises uploading the at least one machine learning model as a task-specific machine learning model to a storage device, such as the data warehouse 20, for access by one or more processes which use at least one machine learning algorithm.

According to embodiments, the foundation models 22 as well as the task-specialized models 41 may generate object masks and category predictions (step 4.2). The model execution is performed in parallel using distributed cloud computing. For the distribution, the dataset 33 may be split into multiple chunks (pieces of the dataset split into smaller units to ease processing) which are processed by temporary compute nodes, which includes preprocessing to serve the machine learning model inputs (in particular, adjusting images of the dataset to a format (size/resolution) required by the model), the actual inference and uploading of a final data output after postprocessing to the data warehouse 20. Inference may occur in temporary compute nodes in the cloud hosting environment, whereby nodes can be allocated on demand for inference tasks.

The inference may leverage output statistics to inform about uncertain model predictions for review guidance and model ensembling (multiple model variations) together with test-time augmentations to generate robust predictions.

In some embodiments, inference involves applying the machine learning model to a fresh dataset (i.e., one not previously used for training) and generating an output or "prediction". Such process is typically also referred to as "operationalizing an ML model" or "putting an ML model into production." During this phase, the inference system accepts new inputs from a content provider (e.g., a third-party company requesting annotations for its datasets as a service), processes the data, feeds it into the ML model, and serves outputs back to the provider to gain datasets annotated with object masks and category predictions.

According to embodiments, output "object masks" represent pixel-wise object detection and can be visualized as colored filters on top of objects in an image. According to some embodiments, semantic segmentation results in "category" predictions (for example: "background" vs. "street" vs. "object"). Instance segmentation results in individual instance predictions (for example: three instances of the same object). Panoptic segmentation includes detecting both object instances and object categories.

Quality Assurance (QA) Review (Cf. Step 5.1):

According to embodiments, through inference, unseen datasets are annotated with instance and category masks/labels. Sometimes the inference results or predictions are wrong or "off", such as that the masks do not align with actual object boundaries.

According to embodiments, as part of a Quality Assurance Review data samples may be added or removed (data curation) and model hyperparameters or the masks themselves may be revisited and corrected to gain a final annotated dataset 51, e.g., stored in the data warehouse 20. In this way, there is a feedback loop. "Model ensembling" is mixing models, whereby base model predictions are aggregated resulting in one final prediction for the unseen data. Test-time augmentations involve changing the input image in some way (distorting it, cutting it, or flipping it, for example) to run through the model again and improve predictions.

Thus, aspects of the invention focus on automating the processing modules M1 to M5 implementing respective method steps, as described above, thus reducing errors, and reducing the time required to annotate egocentric video and image data. Until recently, egocentric data ingesting, processing, proofreading, annotating and model training activities have been difficult, error prone, and time consuming.

According to embodiments, the disclosed data pipeline bundles data standardization, annotation, and model refinement, and it also highly integrates automated annotations along with guidance signals to turn the manual annotation process into a guided proofreading process with minimized time requirements. One remarkable component is the flexible training environment that enables the rapid modification of an existing foundation model or creation to solve a given task with increased accuracy. The model outputs may be integrated into visualization and annotation tools to provide human annotators with initial, accurate annotations for enrichments and final corrections.

One example of such an integration of model outputs and guidance signals for category annotations leverages a lexical database to embed predicted model categories into a hierarchical taxonomy that allows fine-grained suggestions to be displayed for human annotators. This ultimately enables fast model building for specialized objects categories.

Figure 3:
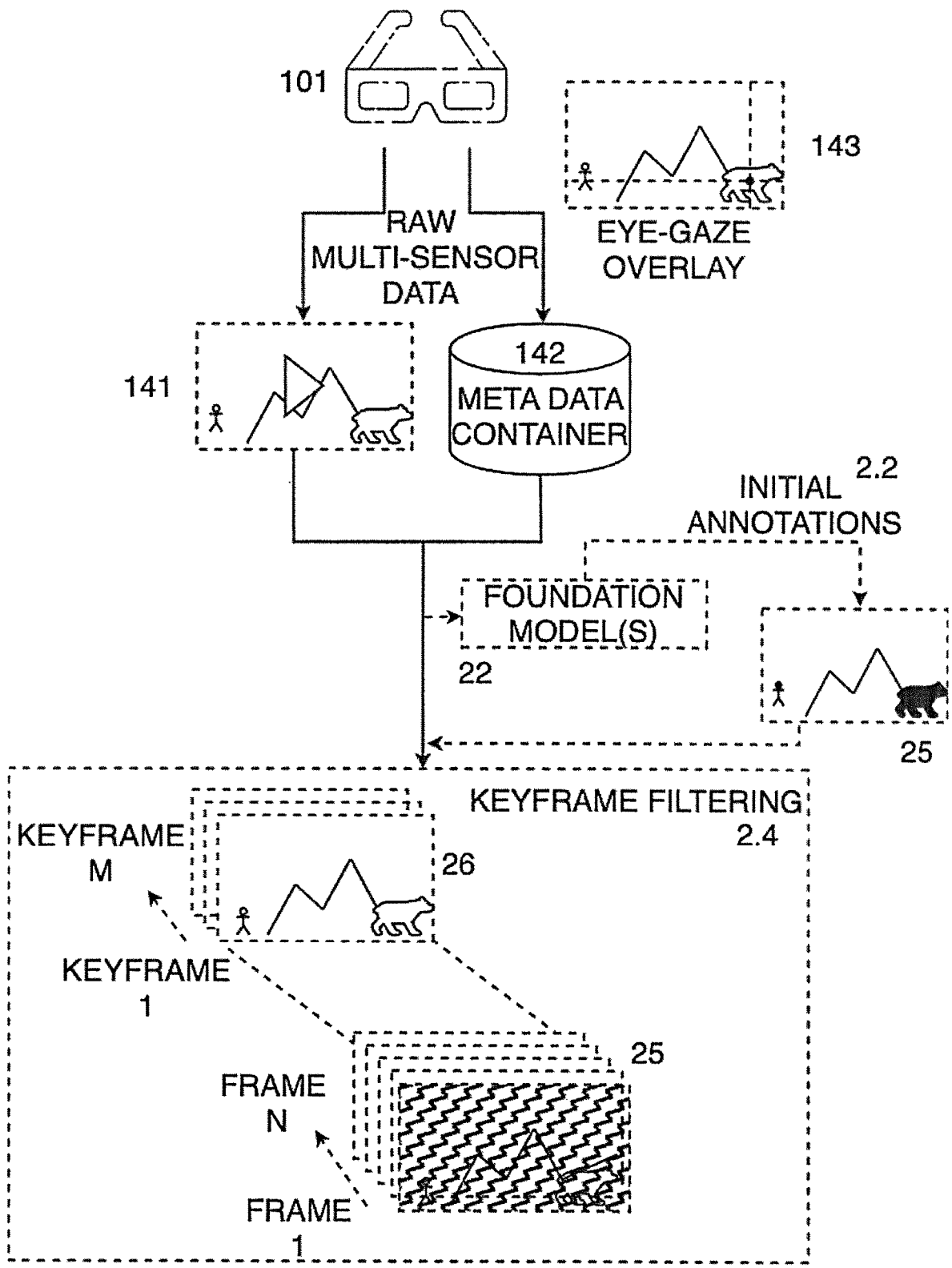
FIG. 3 shows an exemplary scenario in an exemplary use case of a method according to an embodiment of the present disclosure.

FIG. 3 shows an exemplary scenario in an exemplary use case of a method according to an embodiment of the present disclosure. It illustrates schematized data for training and proofreading as applied on a cycling use case, in which sensor data are provided by a head-mounted sensor rig 101 which includes semi-transparent glasses and at least one camera for capturing images or a stream of images (video) of the real environment, and further sensors like audio and eye gaze detection sensors and/or IMU. In addition to providing images 141, further information is extracted and transformed, and a meta data container 142 is assigned with media properties (e.g., video or image), and other information like location information, eye gaze (illustrated in FIG. 3 in an eye-gaze overlay image 143), schema and version information.

One of the keyframes 26 presented by the annotation tool 31 to the annotators (or proofreaders) 32 are accompanied by automatically generated initial annotations (step 2.2), which were generated by the foundation models 22. Keyframes 26 are filtered from image frames 25, as described above.

For example, the IMU data can be used to filter frames from the initial frames 25 (frames 1 to n) that are less informative for the annotation process. For example, it can be determined that significant head movement, detected by the IMU, will lead to motion blur and thus those frames will be excluded to gain a reduced set of filtered keyframes 26 (keyframes 1 to m).

The invention claimed is:

1. A computer-implemented method of providing at least one machine learning model for use in a process which uses at least one machine learning algorithm, comprising:
   receiving, by at least one computing device, sensor data from at least one sensor including receiving at least one image captured by an image sensor; and
   performing, by the at least one computing device, a sequence of processing modules in series, or in an iterative process with one or more feedback loops, from a first to a fifth module of the processing modules, wherein:
      the first module comprises receiving the sensor data, determining a respective incoming source of the sensor data, parsing source information including meta data information, converting the sensor data into a plurality of standardized data items, associating at least some of the standardized data items with meta data information, and ingesting at least some of the standardized data items with associated meta data information in a data warehouse which is adapted for remote access;
      the second module comprises accessing the data warehouse and identifying at least one image keyframe per standardized data item of the data warehouse, and associating additional information indicative of the at least one image keyframe with the respective standardized data item;

the third module comprises presenting the at least one image keyframe and associated additional information of the respective data item via a human machine interface to a human annotator for annotation accompanied by one or more initial annotations automatically generated by one or more foundation models, receiving an annotation from the annotator via the human machine interface and augmenting the at least one image keyframe with corresponding annotation information to at least one annotated dataset;

the fourth module comprises at least one of generating and updating at least one machine learning model using the at least one annotated dataset to also provide updated initial annotations for non-proofread frames; and the fifth module comprises uploading the at least one machine learning model as a task-specific machine learning model to a storage device for access by one or more processes which use at least one machine learning algorithm;

wherein identifying at least one image keyframe per standardized data item comprises excluding image frames that contain little to no contrast or unsharp objects and promoting image frames with rich context.

2. The method of claim 1, wherein the at least one machine learning model is configured to be used by one or more processes of an augmented reality application, and the sensor data include egocentric sensor data collected from the perspective of a user of a wearable computing device.

3. The method of claim 1, wherein the sensor data include one or more of the following data: one or more images; one or more video streams; geographic positional data; audio data; infrared data; collector eye-gaze data, in particular corneal reflection, stereo geometry, eye orientation and/or movement; and inertial measurement data, in particular accelerometer, gyroscope and/or magnetometer data.

4. The method of claim 3, wherein the at least one machine learning model is configured to be used by one or more processes of an augmented reality application and the data is captured by one or more respective sensors worn by a user of an augmented reality application.

5. The method of claim 1, wherein associating at least some of the standardized data items with meta data information comprises assigning a respective meta data container to at least some of the standardized data items containing one or more of the following: a media property, in particular a video or image property, location information, schema and version information, and one or more additional data channels for different sensor input modalities or connected information.

6. The method of claim 1, wherein the first module comprises obfuscation of specific data categories, in particular blurring of data-subject faces, license plates and/or voice-audio filtering, in accordance with at least one regulatory scheme.

7. The method of claim 1, wherein associating at least some of the standardized data items with meta data information comprises assigning additional meta data information to the standardized data items comprising meta data regarding situation, event, objects of interest and/or location tags.

8. The method of claim 1, wherein the first module comprises manual verification of data collected against task requirements, including at least one of functional and legal tasks, and automatic tasks verification via object categories in view.

9. The method of claim 1, wherein the third module comprises one or more processes for manually refining one or more of the annotations including instance segmentation according to which object instances as returned by the machine learning model are used as a starting point for manual revision and corrections.

10. The method of claim 1, wherein the third module comprises one or more processes for manually refining one or more of the annotations including categorization according to which one or more object instances is assigned one or more putative categories that originate from the machine learning model output and are used to display annotation suggestions to the human annotator.

11. The method of claim 1, wherein annotation is further extended by providing guiding signals, such as annotation suggestions, annotation correction suggestions, salient object highlighting and/or putative error markings.

12. The method of claim 1, wherein the third module comprises a validation step during human annotation to ensure quality is high, which can be executed manually or automatically.

13. The method of claim 1, wherein the third module comprises at least one manual refinement process with guidance to highlight image frames or frame regions with high likelihood of annotation errors.

14. The method of claim 1, wherein identifying at least one image keyframe per standardized data item comprises parsing additional sensor information from one or more of gaze tracking, location sensing, inertial measurement data, and context information.

15. A non-transitory computer-readable medium with stored instructions which, when executed by processor, cause the processor to carry out the method of claim 1.

* * * * *